April 23, 1940.  H. A. REECE  2,197,949
APPARATUS AND METHOD FOR CONTROL OF FLOW OF AIR, GASES, AND THE LIKE
Filed Nov. 9, 1939

INVENTOR.
Herbert A. Reece

Patented Apr. 23, 1940

2,197,949

UNITED STATES PATENT OFFICE 2,197,949

APPARATUS AND METHOD FOR CONTROL OF FLOW OF AIR, GASES, AND THE LIKE

Herbert A. Reece, Cleveland Heights, Ohio, assignor to Mechanite Metal Corporation, a corporation of Tennessee Application November 9, 1939, Serial No. 303,653

10 Claims. (Cl. 266—30)

My invention relates to furnaces and the like, and more particularly to wind boxes for metallurgical furnaces such a cupolas and the like, and to the operation of the same.

My present invention herein described is related in subject matter to my invention described in my co-pending United States Patent application, Ser. No. 279,704, filed June 17, 1939, and is directed to the same and similar problems of furnace operation and control of air flow as is set forth in said co-pending application.

In the following discussion and description the operation and structure of a cupola for the remelting of metal will be referred to but it is to be understood that my invention includes the structure and operation of all furnaces or similar devices wherein a blast of air or other gases is supplied through a plurality of tuyères or like openings to the interior of the furnace or similar device.

The control of the air blast delivered to a plurality of tuyères of a furnace from a wind box is an object of my invention.

Another object is the modification of the currents of air of an air blast moving through a wind box.

Another object is the modification of the direction of portions of an air blast passing through a wind box from an inlet to a plurality of outlets.

Another object is to provide apparatus for guiding the direction of a blast of air adjacent to a restricting baffle plate positioned in a wind box.

Another object is to provide apparatus for guiding the air blast passing through the restricting baffle plate in a wind box in a direction vertically toward the plane passing through the tuyère entrances of the furnace.

Another object is the provision for the modification of the flow of air through a wind box by restricting flow of air therethrough and guiding the restricted flow of air vertically within the wind box for directing the air at the point of restriction substantially vertical of the wind box.

Another object is the provision for guiding the direction of the flow of air at the baffle plates through which a blast of air passes in moving through a wind box from an inlet to a plurality of outlets.

Another object is the provision for elimination of tangential flow of a blast of air adjacent a restricting partition through which the blast of air passes.

Another object is the provision for modification of an air blast to deliver the air to a plurality of tuyères at substantially equal velocity.

Another object is the provision of apparatus for, and method of, modifying a flow of air through a common distributing chamber.

Another object is the provision of a device for improving the control of the air blast to a furnace.

Another object is to provide a method for improved operation of a furnace and the supplying of air thereto.

Other objects and a fuller understanding of my invention may be had by referring to the following description and claims, taken in conjunction with the accompanying drawing, in which:

Figure 5:
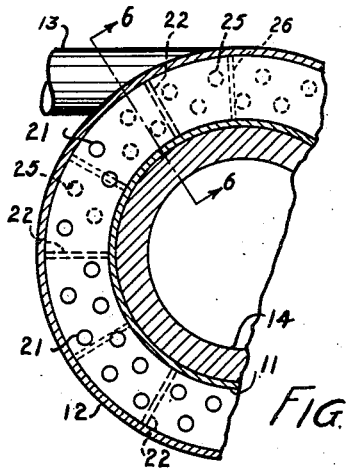
Figure 5 illustrates another modification of the arrangement of parts in an embodiment of my invention.

The furnace or cupola illustrated has a cupola body 11 which is supported upon the support 16. The cupola body or shell 11 is in the form of a cylindrical shaft, the inner walls of the cupola body 11 being lined by a fire brick lining 14. The body 11 and lining 14 are mounted upon the bottom plate 17.

For purposes of simplicity in illustration, the usual tap hole and slag hole are not shown. It has also been considered unnecessary to illustrate such other openings as a clean-out door, breast arch, or drop bottom doors. The cupola illustrated, however, may be considered as having all of the parts necessary for the usual operation of the same.

The wind box 12 of cylindrical outer shape is mounted upon the cupola body 11 by welding or other suitable means and in the embodiment shown, the outer wall of the cupola body forms one of the enclosing walls of the wind box 12. The wind box 12 forms an enclosed jacket surrounding the cupola body 11 in such a way that air introduced into the wind box may circulate entirely around the cupola body.

The inlet conduit 13 is in communication with an air blower or other source of an air blast and the inlet conduit 13 is connected to the wind box 12 at the upper portion of the wind box 12 so as to afford communication between the air blower and the inlet opening 15 of the wind box 12.

In the cupola illustrated there are six tuyères extending through the wall and lining of the cupola body 11 so as to establish communication between the interior of the shaft of the cupola and the wind box 12. Tuyères 30, 31, 32, 33, 34 and 35 are shown in dotted lines in Figure 2. Three of the six tuyères are viewed in Figure 2 from the inside of the shaft of the furnace. The six tuyères are of substantially equal size and are uniformly spaced around the periphery of the cupola. The tuyères enter the cupola body at a low level in the cupola and communicate with the wind box in a lower portion thereof. In order that the operator may look into the tuyères from the outside of the furnace, peep holes are provided in the wind box opposite each of the tuyères. Peep hole covers 18 hingedly connected to the wind box 12 cover the outside of the peep holes.

Positioned within the wind box below, and at a distance from, the inlet opening the annular baffle plate 20 is positioned. The baffle plate 20 encircles the cupola body and is secured to the walls of the wind box 12 and the cupola body 11 by welding or other suitable means. Baffle plate 20 is perforated over its surface and has uniformly distributed therein a plurality of openings or open spaces 21.

Positioned at a distance below the baffle plate 20 and also intermediate the inlet opening and the plurality of tuyères there is another annular baffle plate 24. The lower annular baffle plate 24 likewise has a plurality of openings or open spaces 25 uniformly distributed therein. The baffle plates 20 and 24 act to restrict the flow of the air blast from the inlet opening to the plurality of tuyères. The limitation of the flow of air through the open spaces in the respective baffle plates modifies the flow of air through the wind box as it moves downwardly from the upper portion of the wind box adjacent the inlet to the lower portion of the wind box adjacent the tuyères.

Figure 1:
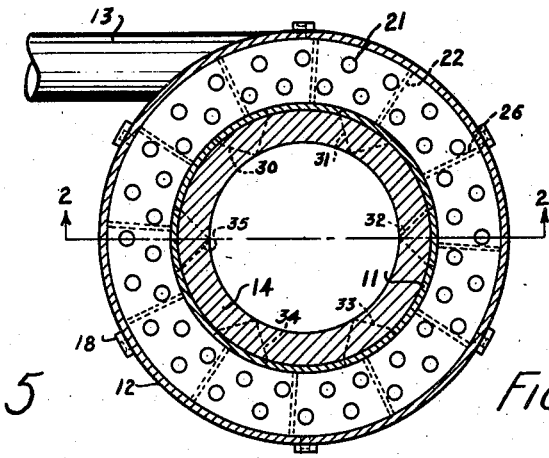
Figure 1 is a transverse cross-sectional view taken through a furnace wind box utilizing my invention looking in the direction of the arrows 1—1 of Figure 2.
Figure 3:
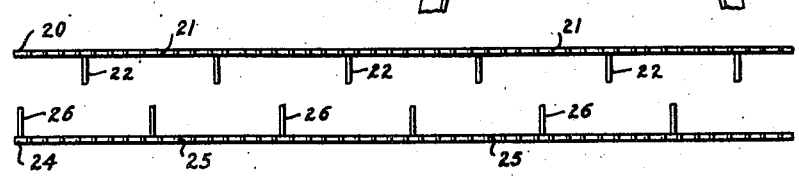
Figure 3 is a view, largely diagrammatical in nature, showing the relative positioning of the guide plates in respect to the baffle plate, the view being with the annular baffle plates opened up and disposed in the flat.

Extending downwardly from the baffle plate 20 and substantially at right angles thereto there are provided a plurality of vertical plates 22. The plates 22 are disposed at intervals around the annular extent of the baffle plates 20 as is illustrated in Figure 1 and 3. The plates 20 are secured by welding or other suitable means to the baffle plate 20 or may be secured to the inner walls of the wind box closely adjacent to the lower surface of the baffle plates 20. The plates 22 have their lateral surfaces disposed in vertical planes and longitudinally of the wind box. The spacing of the plates around the annular extent of the baffle plate 20 is at uniform intervals and each baffle plate is so disposed as to extend radially out from the cylindrical cupola body.

Figure 2:
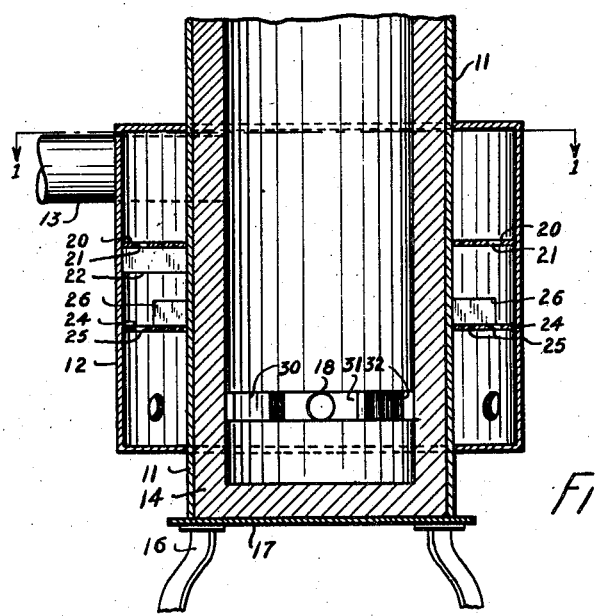
Figure 2 is a sectional view taken lengthwise of the furnace and wind box along the line 2—2 of Figure 1, showing the positioning of guide plates adjacent the annular baffle plates within the wind box.

Extending upwardly from, and substantially at right angles to, the lower baffle plate 24 there are a plurality of vertical plates 26. The plates 26 are also disposed around the annular extent of the baffle plate 24 at regular intervals and are directed radially out from the cylindrical body of the furnace. Both the plates 22 and the plates 26 extend substantially across the interior of the wind box from the outer cylindrical wall to the inner cylindrical wall. In Figure 2, since this is a cross-sectional view taken in the direction of the arrows 2—2 of Figure 1, only one plate 22 is shown in full and plates 26 are shown disposed at an angle to the plane of the drawing.

The plates 22 and plates 26 are in staggered relationship around the wind box. Figure 1 showing both the plates 22 and 26 in dotted lines illustrates the alternate relationship of the downwardly extending plates and the upwardly extending plates. Figure 3 also illustrates the relative positioning of plates 22 extending down from the baffle 20 and plates 26 extending up from the baffle 24.

The vertically disposed plates 22 and 26 act to resist tangential or circular flow of the air blast moving through the wind box in the vicinity of the baffle plate. The air blast moves downwardly and is restricted by the baffle plates 20 and 24 and a limited flow of air passes through the openings 21 and 25, respectively. As the air in the wind box is moving at a rapid rate of speed it tends to rapidly circle through the wind box by reason of the shape, arrangement and positioning of the wind box, inlet, and outlets. Some of the rapid tangential flow may continue even after modification by the action of the perforate baffle plate and particularly if the speed or tangential nature of the flow should increase over that for which the baffle plates were designed. It is also sometimes considered undesirable to place too great a restriction upon the flow of the air blast through the baffle plates in the wind box. The guide plates 22 and 26, however, co-operate with the restricting baffle plates to guide the flow of air vertically of the wind box. The surface of the plates 22 and 26 resists the circling or tangential flow of the air and guides the course of the air in a vertical direction. By helping to break up the circling or tangential flow the baffle plates are made more effective for uniform restriction of the air blast and to thus modify the velocity of the air similarly in all portions of the wind box. The disposition of the vertical plates 22 and 26 adjacent to the baffle plates 20 and 24, respectively, provides for the aiding of the restricting action of the baffle plates with the guiding action of the vertical plates to make each of them more effective than if used alone. The placing of the vertical plates 22 and 26 between the baffle plates 20 and 24 provides a section or sub-chamber within which the air blast is guided from one baffle to another and goes through the successive stages of restriction without rapid tangential flow therebetween.

The improvement in the modification of the currents of the air blast and the control of the velocity thereof provides for the supplying of the air blast to the plurality of tuyères at substantially equal velocity. The control of the velocity of the air supplied to the tuyères provides for the increased efficiency in the operation of the furnace. The combination of the parts here illustrated provides an improved apparatus for the control of air velocity in the wind box of a furnace or the like. The manner of controlling and modifying the air blast as herein described provides an improved method of furnace operation and supplying of an air blast thereto.

Figure 4:
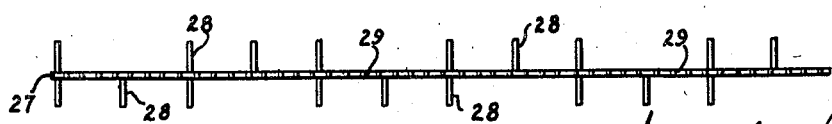
Figure 4 is a view similar in nature to that of Figure 3 and illustrates a modified form of my invention.

Figure 4 illustrates a modified form of my invention in which only a single baffle plate 27 is utilized. A plurality of evenly distributed open spaces 29 are extended over the surface of the baffle plate 27. In the modification of Figure 4 there are a plurality of vertical plates 28 extending substantially at right angles from the baffle plate 27. The vertical plates 28 are arranged in alternate relation in that some of the vertical plates extend both upwardly and downwardly from the baffle plate 27 while other of the vertical plates 28 extend only upwardly or downwardly. Other arrangements of the vertical plates relative to the baffle plates may be provided for, one such arrangement being illustrated in Figure 4. As was explained in connection with the preferred form described above there is in the modified form in which only one baffle plate is utilized the same cooperation between the restricting action of the baffle plate and the guiding action of the vertical plates. The guiding action of the vertical plates in resisting tangential flow and directing the air blast longitudinally of the wind box makes the restricting action of the baffle plates more effective in uniformly modifying the air blast flow. The restricting action of the baffle plates in turn makes the guiding action of the vertical plates more effective by restraining the flow of air vertically between the parallel guide plates and aiding in the equalizing of the flow therethrough.

Figure 5 illustrates a modified arrangement in which the upper baffle plate 20 does not have any openings 21 at one location in the annular extent of the baffle plate, has a very few openings 21 in adjacent portions, and has the maximum number of openings 21 at a more distant portion of the baffle plate. At the point of entrance of the blast pipe or inlet conduit 13 the air blast tends to move very rapidly and is more difficult to control. Therefore, in this modification the upper baffle plate immediately below the inlet opening is closed to prevent the blast of air passing through the baffle plate at the vicinity of the greatest velocity of the air blast. By the arrangement shown the restriction is greater near the entrance of the blast pipe 13 and the restriction is less at a distance removed therefrom. Portions intermediate these two extremes are provided with a proportional amount of restriction, less than that at the entrance of the blast pipe but more than that at a location removed therefrom.

Figure 6:
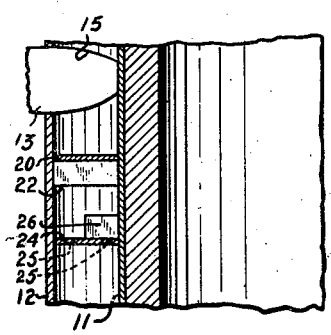
Figure 6 is a sectional view taken in the direction of the arrows 6—6 of Figure 5.

The vertical plates 22 and 26 are extended in the described manner from the baffle plates 20 and 24. The lower baffle plate 24 has the openings 25 evenly distributed therein around the entire annular extent of the baffle plate. By combining the restricting action of the baffle plates the guiding action of the vertical plates interposed therebetween, and the proper positioning of the greatest restriction at the point where the greatest velocity may be expected as described in conjunction with the drawing of Figures 5 and 6, an efficient and effective apparatus is provided for the modification and control of the air blast in the wind box. This cooperation of the parts in modifying the velocity of the air blast produces an arrangement for supplying the air blast to a plurality of tuyères at substantially equal velocity.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a furnace having a wind box and a perforate baffle plate positioned substantially horizontally therein to divide the wind box into an upper and a lower portion, the open spaces in the baffle plate permitting a restricted flow of air from one portion of the wind box to another for modifying the velocity of an air blast passing through the wind box from an inlet to the entrances of a plurality of tuyères, a plurality of guide plates disposed adjacent to, and at an angle to the plane of, said baffle plate for guiding said blast of air adjacent to the baffle plate in a direction toward a substantially horizontal plane passing through said entrances of the tuyères.

2. In a furnace having an annular wind box and a perforate baffle plate positioned substantially horizontally therein to divide the wind box into an upper and a lower portion, the open spaces in the baffle plate permitting a restricted flow of air from one portion of the wind box to another for modifying the velocity of an air blast circulating around through the wind box from an inlet at one elevation to the entrances of a plurality of tuyères arranged in a plane at a second elevation, a plurality of guide plates extending substantially vertically from said baffle plate at intervals around the wind box for guiding said air blast at said baffle plate vertically toward the plane of said entrances.

3. In a furnace having a wind box forming a common distributing chamber for supplying blown air to the entrances of a plurality of tuyères communicating with said furnace, said wind box having an inlet adapted to communicate with a source of blown air, the combination of a perforate baffle plate dividing said wind box into adjacent portions disposed substantially transversely within the wind box intermediate of, and at a distance from, said inlet and said outlets for permitting a restricted flow of air therethrough from one portion of the wind box to another, and a plurality of spaced plates disposed substantially vertically within the wind box at said baffle plate at intervals around the wind box for directing the air adjacent said baffle plate substantially vertically of the wind box.

4. In a furnace having a wind box for supplying a blast of air to a plurality of tuyères, said wind box having an inlet adapted to communicate with a source of an air blast and having outlets in communication with said tuyères, a plurality of partitions disposed transversely of said wind box intermediate of said inlet and said outlets, said partition dividing said wind box into adjacent sections, said partitions having open spaces therein for permitting limited flow of air therethrough from one section to the next succeeding section of the wind box, said partitions having guiding portions disposed at intervals around the lateral dimension of the wind box and extended longitudinally thereof at an angle to said partitions for guiding said air blast at said angle, the limitation of flow of air through said partitions and the guiding of said flow of air modifying the velocity of the air blast delivered to said outlets.

5. In a furnace having a wind box for supplying a blast of air to a plurality of tuyères, said wind box having an inlet adapted to communicate with a source of an air blast and having outlets in communication with said tuyères, a plurality of restricting partitions disposed transversely of said wind box intermediate of said inlet and said outlets, said partitions dividing said wind box into adjacent sections, said partitions having restricted open spaces distributed therein for permitting limited flow therethrough from one section to the next succeeding section of the wind box, each of said partitions having plates extending therefrom toward another of said partitions, said plates being disposed at intervals around the extent of said wind box, said plates resisting flow of air laterally of said partitions to modify velocities of the air blast flowing through the wind box to said outlets.

6. In a furnace having a wind box positioned around the body of the furnace for supplying air to a plurality of tuyères entering the furnace, said wind box having an inlet adapted to communicate with a source of an air blast and having outlets in communication with said tuyères, the arrangement of the wind box, inlet, and outlets being such that currents of air of unequal velocities circulate around the interior of the wind box, baffle plate means carried by the wall of the wind box and extending into the wind box in the path of the flow of air to divide the wind box into a series of portions, said baffle plate means resisting the said flow of air to obstruct said currents of air moving through the wind box from one portion to another, conduit means extending through said baffle plate means to permit limited flow of air therethrough from one portion of the wind box to another, and guide means positioned in the vicinity of said baffle plate means and conduit means for meeting currents of air moving laterally of the baffle plate means and for directing said currents transversely of the baffle plate means to modify the flow of the air blast supplied to said outlets.

7. In a furnace having a wind box positioned around the body of the furnace for supplying air to a plurality of tuyères entering the furnace, said wind box having an inlet adapted to communicate with a source of an air blast and having outlets in communication with said tuyères, the arrangement of the wind box, inlet, and outlets being such that currents of air of unequal velocities circulate around the interior of the wind box, said wind box having a perforate baffle disposed transversely of said wind box intermediate of the inlet and outlets partitioning said wind box into sections for restricting the flow of the air blast through the wind box from one section to another, a plurality of plates extending at substantially right angles, and adjacent, to said baffle and being disposed at intervals along the baffle radially of the wind box, said plurality of plates modifying the course of the air blast adjacent the baffle, said air blast being supplied to said outlets modified by said baffle and said plates.

8. In a furnace having a wind box positioned around the body of the furnace for supplying air to a plurality of tuyères entering the furnace, said wind box having an inlet adapted to communicate with a source of an air blast and having outlets in communication with said tuyères, the arrangement of the wind box, inlet, and outlets being such that currents of air of unequal velocities circulate around the interior of the wind box, a plurality of plates disposed in said wind box intermediae of the inlet and outlets and extended across the wind box between the side walls thereof, and mounting means for securing said plates in position in the wind box, said plates being spaced at intervals around the wind box and extended substantially radially thereof, the planes of said plates being disposed substantially at right angles to a plane passing through said outlets to provide separate courses for the air blast longitudinally of the air blast, said air blast moving through said longitudinal courses being modified thereby before being supplied to said outlets.

9. The method of controlling the velocities of air supplied to a plurality of tuyères of a furnace from an enlarged air chamber through which blown air is passed, comprising: restricting the flow of air from one portion of the air chamber to another, permitting a downward limited flow of air from said one portion of the air chamber to said another portion of the air chamber, distributing the said limited flow of air substantially uniformly throughout said another portion, and directing the distributed limited flow of air in substantially vertical parallel courses from said one portion of the air chamber to said another portion of the air chamber to said tuyères at velocities modified in passing from said one portion to said another portion.

10. In the operation of a furnace, the method of furnishing an air blast to a plurality of tuyères having predetermined volume capacities, comprising: supplying an air blast to a wind box, partially enclosing the air blast in one portion of the wind box at one elevation, permitting a limited flow of the air blast into a second portion of the wind box at another elevation, distributing said limited flow of air in the wind box substantially uniformly around the circumferential area of the wind box, and guiding said air blast adjacent the junction of said portions of the wind box longitudinally of the air box from said one elevation to said another elevation toward said tuyères at modified velocities.

HERBERT A. REECE.